US012367301B2

(12) United States Patent
Acharya et al.

(10) Patent No.: US 12,367,301 B2
(45) Date of Patent: Jul. 22, 2025

(54) SERVER-SIDE RENDERING PASSWORD PROTECTED DOCUMENTS

(71) Applicant: Dropbox, Inc., San Francisco, CA (US)

(72) Inventors: Aditya Acharya, New York, NY (US); Jingsi Zhu, Jersey City, NJ (US); Sarah Vente, New York, NY (US); Ian Macartney, San Francisco, CA (US); Ahmet Emre Unal, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 17/559,407

(22) Filed: Dec. 22, 2021

(65) Prior Publication Data

US 2022/0114272 A1    Apr. 14, 2022

Related U.S. Application Data

(63) Continuation of application No. 15/866,837, filed on Jan. 10, 2018, now Pat. No. 11,216,568.

(51) Int. Cl.
*G06F 21/62* (2013.01)
*G06F 16/178* (2019.01)
(Continued)

(52) U.S. Cl.
CPC ...... *G06F 21/6209* (2013.01); *G06F 16/1794* (2019.01); *G06F 21/31* (2013.01);
(Continued)

(58) Field of Classification Search
CPC .. G06F 21/6209; G06F 21/31; G06F 16/1794; G06F 40/106; H04L 9/0863;
(Continued)

(56) References Cited

U.S. PATENT DOCUMENTS

| 7,702,633 B2 | 4/2010 | Burns et al. |
| 8,032,482 B2 | 10/2011 | Rosenberg et al. |

(Continued)

OTHER PUBLICATIONS

Advisory Action from U.S. Appl. No. 15/866,837, mailed Jul. 13, 2020, 3 pages.

(Continued)

*Primary Examiner* — Jeremy S Duffield
(74) *Attorney, Agent, or Firm* — Polsinelli PC

(57) ABSTRACT

In some examples, a system for server-side rendering of password-protected files can receive, from a client device, a request to view a file on the system, determine that the file should be converted to a different format prior to presentation at the client device, and determine that the file is a password-protected file. The system can send a response to the client device indicating the file is a password-protected file. In response to receiving the password from the client device, the system can generate, based on the password, a preview of the password-protected file including at least a portion of the password-protected file rendered in the different format. After generating the preview, the system can store an encrypted copy of the preview in storage for future requests, and send the preview to the client device.

19 Claims, 9 Drawing Sheets

(51) Int. Cl.
*G06F 21/31* (2013.01)
*G06F 40/106* (2020.01)
*H04L 9/08* (2006.01)
*H04L 9/32* (2006.01)
*H04L 9/40* (2022.01)

(52) U.S. Cl.
CPC .......... *G06F 40/106* (2020.01); *H04L 9/0863* (2013.01); *H04L 9/0894* (2013.01); *H04L 9/3226* (2013.01); *H04L 9/3234* (2013.01); *H04L 63/083* (2013.01)

(58) Field of Classification Search
CPC ... H04L 9/0894; H04L 9/3226; H04L 9/3234; H04L 63/083
See application file for complete search history.

(56) References Cited

U.S. PATENT DOCUMENTS

| | | | |
|---|---|---|---|
| 8,171,286 B2 | 5/2012 | Harris et al. | |
| 8,990,156 B2 | 3/2015 | Littleson et al. | |
| 9,063,912 B2 | 6/2015 | Seibert et al. | |
| 9,292,246 B1 | 3/2016 | Weiser et al. | |
| 9,756,039 B2 | 9/2017 | Shmulevich et al. | |
| 2005/0246551 A1 | 11/2005 | Dondl et al. | |
| 2009/0022313 A1* | 1/2009 | Akiyama | H04N 1/2307 380/243 |
| 2010/0149570 A1* | 6/2010 | Kamiya | G06F 21/608 358/1.14 |
| 2010/0202610 A1* | 8/2010 | Warren | H04L 67/04 380/200 |
| 2011/0314275 A1* | 12/2011 | Gopshtein | H04L 9/0894 713/165 |
| 2012/0254140 A1* | 10/2012 | Srinivasaraghavan | G06F 16/1844 707/705 |
| 2012/0272339 A1 | 10/2012 | Kumaravel et al. | |
| 2013/0110854 A1* | 5/2013 | Lockhart | G06F 16/739 707/756 |
| 2013/0111326 A1 | 5/2013 | Lockhart et al. | |
| 2013/0238969 A1* | 9/2013 | Smith | G06F 40/106 715/255 |
| 2014/0082071 A1* | 3/2014 | Rexer | G06F 21/6245 709/204 |
| 2014/0096221 A1* | 4/2014 | Wallis | G06F 21/335 726/9 |
| 2014/0164760 A1* | 6/2014 | Hybertson | H04N 21/4627 713/153 |
| 2014/0172701 A1* | 6/2014 | Pandhare | G06Q 20/10 705/41 |
| 2014/0223573 A1 | 8/2014 | Reedy et al. | |
| 2014/0289530 A1* | 9/2014 | De Waal | H04N 21/4788 709/204 |
| 2014/0289629 A1 | 9/2014 | Rossmann et al. | |
| 2016/0026827 A1* | 1/2016 | Ko | G06F 21/6209 713/193 |
| 2016/0028699 A1* | 1/2016 | Ambroz | H04L 9/3242 713/168 |
| 2016/0070812 A1 | 3/2016 | Murphy et al. | |
| 2016/0127352 A1 | 5/2016 | Xu et al. | |
| 2016/0283085 A1* | 9/2016 | Beausoleil | G06Q 10/10 |
| 2017/0075530 A1 | 3/2017 | Genoni et al. | |
| 2017/0272257 A1* | 9/2017 | Satoh | H04L 9/0894 |
| 2018/0012032 A1* | 1/2018 | Radich | H04L 9/30 |
| 2018/0082067 A1* | 3/2018 | Yamaguchi | G06F 21/602 |
| 2018/0137300 A1* | 5/2018 | Shi | G06F 21/6218 |
| 2019/0179876 A1 | 6/2019 | Zhang et al. | |

OTHER PUBLICATIONS

Fabian G., "Augmented Compression for Server-Side Rendering," VMV, 2008, 10 pages.
Final Office Action from U.S. Appl. No. 15/866,837, mailed Jul. 2, 2021, 29 pages.
Final Office Action from U.S. Appl. No. 15/866,837, mailed May 4, 2020, 20 pages.
"Google Drive Updated with New Preview Feature," TechTree.com; Bangalore, Athena Information Solutions Pvt. Ltd., Feb. 23, 2013, 2 pages.
Non-Final Office Action from U.S. Appl. No. 15/866,837, mailed Nov. 18, 2020, 36 pages.
Non-Final Office Action from U.S. Appl. No. 15/866,837, mailed Oct. 16, 2019, 32 pages.
Notice of Allowance from U.S. Appl. No. 15/866,837, mailed Sep. 29, 2021, 10 pages.

* cited by examiner

SERVER-SIDE RENDERING PASSWORD PROTECTED DOCUMENTS

CROSS-REFERENCE TO RELATED APPLICATIONS

This application is a continuation of U.S. application Ser. No. 15/866,837, filed on Jan. 10, 2018, entitled, SERVER-SIDE RENDERING PASSWORD PROTECTED DOCUMENTS, which is hereby expressly incorporated herein by reference in it entirety.

TECHNICAL FIELD

The present technology pertains to server-side rendering content items.

BACKGROUND

The ubiquity of the Internet has created a digital revolution that continues to reshape business and society. The Internet has transformed how users work, interact, and conduct business. Through the Internet, users can interact with users and content across the globe directly from a web browser. Numerous web browser technologies have emerged with increasing capabilities for handling a wide range of content and data types on the Internet. Nevertheless, the increasing diversity of data available on the Internet has created significant challenges. For example, web browsers are unable to render various types of data and poorly equipped to handle many others. In some cases, web servers can deliver pre-rendered content and address rendering issues before presentation at the client. However, both client-side and server-side rendering solutions variously have functional and performance limitations that can result in undesirable behavior and performance delays, often degrading the user's experience and even compromising security.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not, therefore, to be considered to be limiting of its scope, the principles herein are described and explained with additional specificity and detail through the use of the accompanying drawings in which.

DETAILED DESCRIPTION

Figure 1A:
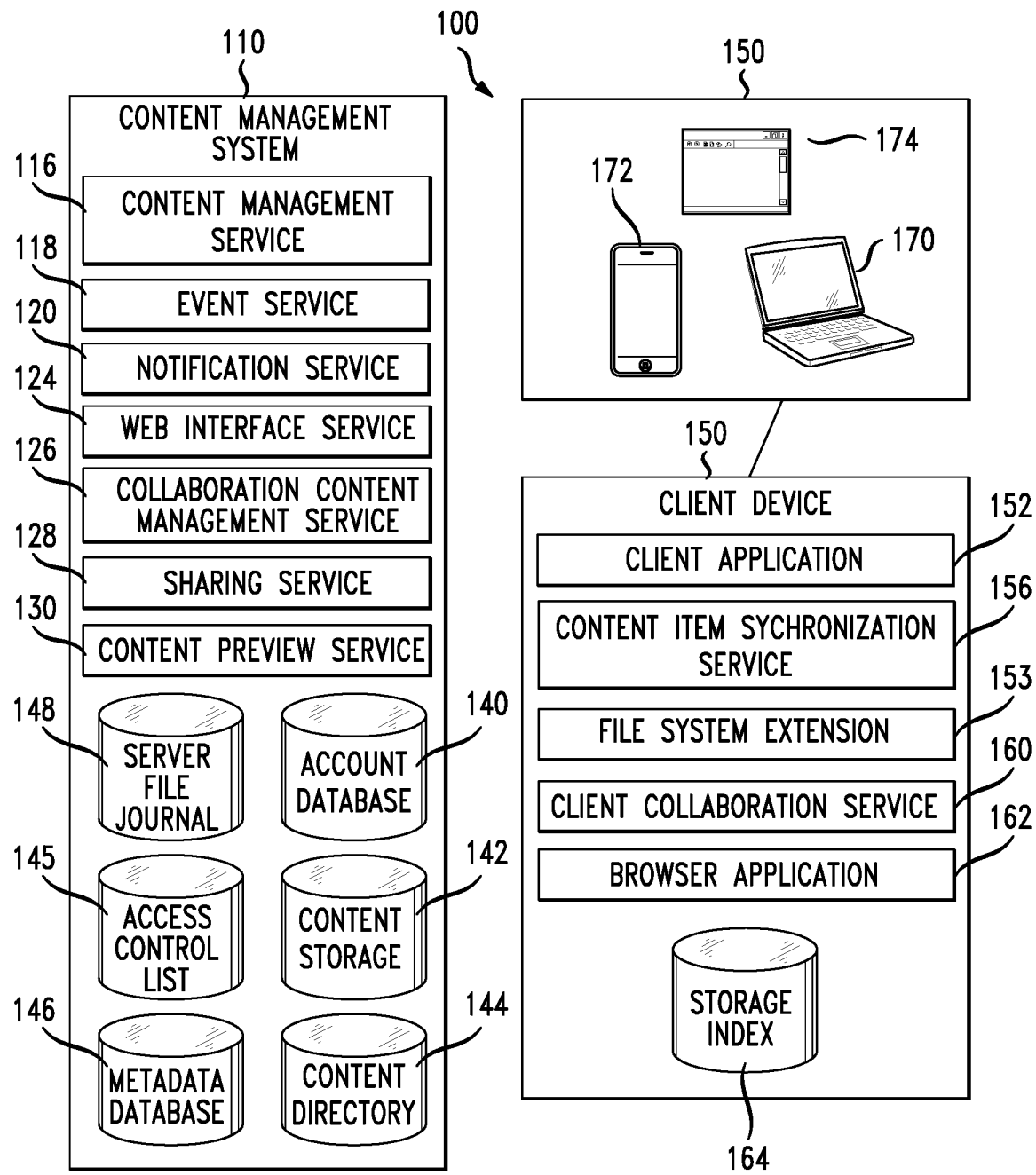
FIG. 1A illustrates an example system configuration of a content management system and client devices.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Web browsers and software applications provide an interface to the Internet by communicating with servers and rendering Internet content for presentation at the client. Web browsers can receive content from servers and display the content in web pages at the client. For example, a web browser can receive a file from a server and parse the file into HTML (hypertext markup language) elements for display by the web browser on a web page at the client. Webpages and content presented on the client can be rendered locally at the client via client-side rendering (CSR) or rendered by the server via server-side rendering (SSR). In a CSR implementation, a web browser at the client can receive a file from a server and parse the file into HTML (hypertext markup language) elements for display by the web browser at the client. This parsing and rendering is performed at the client (i.e., client-side).

In an SSR implementation, content to be presented at the client can be rendered by the server (e.g., server-side) as HTML documents containing images, text, HTML assets, etc. The server-side rendered HTML documents can be transmitted to the client for display by the web browser. The web browser at the client can display the HTML documents received by the server and avoid parsing the content into HTML elements as done in the CSR context. By offloading a significant portion of the processing burden to the server, SSR can provide various advantages.

At the same time, SSR has various limitations. For example, in the CSR context, the web browser can locally support rich content interactions, such as user inputs. Such content interactions have historically presented significant challenges in the SSR context. SSR is better suited for static content and generally does not properly handle content items that require dynamic interactions traditionally handled at the client. For example, if a server receives a client request for a password-protected file, the server cannot properly render the file for the client without the password, or interactively obtain and apply the password to render the file for the client. As a result, server-side rendering of the password-protected file will fail.

The disclosed technology addresses the Internet-centric problems mentioned above pertaining to server-side rendering Internet content. The approaches set forth herein provide efficient and robust server-side rendering solutions capable of handling content interactions traditionally performed at the client and rendering non-HTML assets into HTML assets. For example, the server-side rendering solutions herein can render non-HTML, password-protected files into HTML assets for presentation on a web browser. The server-side rendering solutions can enforce password-protection requirements set on files and efficiently handle interactions for obtaining passwords and rendering previews for such password-protected files. The previews of the password-protected files can be rendered and provided to the clients for display at a local web browser without compromising security. The rendering techniques herein provide a variety of file conversion procedures for rendering previews and support a wide-array of file formats and asset types, including non-HTML-native assets.

Disclosed are systems, methods, and computer-readable storage media for server-side rendering of password-protected files. In one example, a content management system can receive, from a client application at a client device, a request to view a file on the content management system. For example, the content management system can receive from a browser at the client device a request to view a file stored at the content management system for a user account registered at the content management system.

The content management system can determine that the file should be rendered for presentation by the client application at the client device. For example, the content management system may determine that the client application is not the native application for the type or format of the file, and the file should be rendered and/or converted for the client application. In some cases, the content management system can determine that the file should be converted to a particular format prior to presentation at the client device. For example, the content management system can determine that the file should be converted and rendered in a specific format supported by the client application. The content management system can thus attempt to convert and/or render the file for presentation at the client device.

The content management system can determine that the file is a password-protected file and cannot be rendered or converted without a password. For example, the file can be stored on the content management system with password-protection settings requiring a password to access the file from storage and/or view its contents. The password-protected settings can be defined by a user for the file, and may include a password provided by the user. When the content management system attempts to convert and/or render the file without the password, the content management system may detect an error indicating that the file is protected by a password. Based on the error, the content management system can determine that the file is a password-protected file. The content management system can then send a response to the client device with a password error and/or an indication that a password is needed to access the file.

When the content management system receives the password from the client device, the content management system can generate, based on the password, a preview of the password-protected file. The preview can include at least a portion of the data or content in the password-protected file, rendered in the different format. The content management system can convert the password-protected file to the different format in order to generate the preview. For example, the content management system can convert a portable document format (PDF) file to an image file (e.g., PNG) which can be the preview of the password-protected file.

After generating the preview, the content management system can store or cache an encrypted copy of the preview for future requests. The content management system can encrypt or decrypt the preview using the password and/or the request from the client device containing the password. The content management system can also store or cache the password to quickly validate (or reject) future requests and/or decrypt the encrypted copy of the stored or cached preview. After generating the preview, the content management system can send the preview to the client device for presentation or display at the client device. The client device can display the preview to view the content of the password-protected file, obtaining the rendered preview of the password-protected file while enforcing the password protection settings set on the file.

Further description, examples, and variations are provided below in the disclosure as follows. The disclosure begins with a discussion of example architectures and configurations for content and collaboration environments, as shown in FIG. 1. A more detailed description of technologies for server-side rendering, as shown in FIGS. 2 through 6, will then follow. The disclosure concludes with a description of an example computing device for accessing content items and collaborating with users, as shown in FIG. 7. The disclosure now turns to FIG. 1.

In some embodiments the disclosed technology is deployed in the context of a content management system having content item synchronization capabilities and collaboration features, among others. An example system configuration 100 is shown in FIG. 1A, which depicts content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, company, etc.) can create an account with content management system, and account details can be stored in account database 145. Account database 140 can store profile information for registered entities. In some cases, profile information for registered entities includes a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of the groups can inherit the permissions. For example, a marketing group can have access to one set of content items while an engineering group can have access to another set of content items. An administrator group can modify groups, modify user accounts, etc.

Content Item Storage

A feature of content management system 110 is the storage of content items, which can be stored in content storage 142. As used herein, content items can be any digital data such as documents, collaborative content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 is combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content management service 116, which includes software or other processor executable instructions for managing the storage of content items including, but not limited to, receiving content items for storage, preparing content items for storage, selecting a storage location for the content item, retrieving content items from storage, etc. In some embodiments, content management service 116 can divide a content item into smaller chunks for storage at content storage 142. The location of each chunk making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can ensure that content item duplicates are recognized as such since the deterministic hash function will output the same identifier for every copy of the same content item, but will output a different identifier for a different content item. Using this methodology, content management service 116 can output a unique ID for each content item.

Content management service 116 can also designate or record a content path for a content item. The content path can include the name of the content item and/or folder hierarchy associated with the content item. For example, the content path can include a folder or path of folders in which the content item is stored in a local file system on a client device. Content management service 116 can use the content path to present the content items in the appropriate folder hierarchy, such as a tree-like directory structure. While content items are stored in content storage 142 in blocks and may not be stored under a tree like directory structure, such directory structure is a comfortable navigation structure for users Content management service 116 can define or record a content path for a content item wherein the "root" node of a directory structure can be a namespace for each account. Within the namespace can be a directory structure defined by a user of an account and/or content management service 116. Content directory 144 can store the content path for each content item as part of a content entry.

In some embodiments the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure is merely a comfortable navigation structure for users, but does not correlate to storage locations of content items in content storage 142.

While the directory structure in which an account views content items does not correlate to storage locations at content management system 110, the directory structure can correlate to storage locations on client device 150 depending on the file system used by client device 150.

As addressed above, a content entry in content directory 144 can also include the location of each chunk making up a content item. More specifically, the content entry can include content pointers that identify the location in content storage 142 of the chunks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 116 can also store metadata describing content items, content item types, folders, file path, and/or the relationship of content items to various accounts, collections, or groups in metadata database 146, in association with the unique ID of the content item.

Content management service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control that tracks changes to content items, different versions of content items (including diverging version trees), and a change history that can be acquired from the server file journal 148. The change history can include a set of changes that, when applied to the original content item version, produce the changed content item version.

Content Item Synchronization

Another feature of content management system 110 is synchronization of content items with at least one client device 150. Client device(s) can take different forms and have different capabilities. For example, client device 170 is a computing device having a local file system accessible by multiple applications resident thereon. Client device 172 is a computing device wherein content items are only accessible to a specific application or by permission given by the specific application, and the content items are stored either in an application specific space or in the cloud. Client device 174 is any client device accessing content management system 110 via a web browser and accessing content items via a web interface. While example client devices 170, 172, and 174 are depicted in form factors such as a laptop, mobile device, or web browser, it should be understood that the descriptions thereof are not limited to devices of these example form factors. For example a mobile device such as client 172 might have a local file system accessible by multiple applications resident thereon, or client 172 might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a content item synchronization service 156.

Content item synchronization service 156 can be in communication with content management service 116 to synchronize changes to content items between client device 150 and content management system 110.

Client device 150 can synchronize content with content management system 110 via content synchronization service 156. The synchronization can be platform agnostic. That is, content can be synchronized across multiple client devices of varying type, capabilities, operating systems, etc. Content synchronization service 156 can synchronize any changes (new, deleted, modified, copied, or moved content items) to content items in a designated location of a file system of client device 150.

Content items can be synchronized from client device 150 to content management system 110, and vice versa. In embodiments wherein synchronization is from client device 150 to content management system 110, a user can manipulate content items directly from the file system of client device 150, while file system extension 156 (which can be integrated with the local file system, or even the operating system kernel) can intercept read, write, copy, move, delete commands relative to content items in the designated location of the file system of client device 150.

When file system extension 153 notices a write, move, copy, or delete command, it can notify content item synchronization service 156, which can synchronize the changes to content management system service 116. In some embodiments, content item synchronization service 156 can perform some functions of content management system service 116 including functions addressed above such as dividing the content item into blocks, hashing the content item to generate a unique identifier, etc. Content synchronization service 156 can index content within client storage index 164 and save the result in storage index 164. Indexing can include creating a unique identifier for each content item. In some embodiments, content synchronization service 156 creates this unique identifier by putting the data of the content item (e.g., excluding the filename and/or other metadata) through a hash function; as addressed above, content management system can use a similar process to provide identifiers to content on content management system 110.

Content synchronization service 156 can use storage index 164 to facilitate the synchronization of at least a portion of the content within client storage with content associated with a user account on content management system 110. For example, content synchronization service 156 can compare storage index 164 with content management system 110 and detect differences between content on client storage and content associated with a user account on content management system 110. Content synchronization service 156 can then attempt to reconcile differences by uploading, downloading, modifying, and deleting content on client storage as appropriate. Content management service 116 can store the changed or new block for the content item and update server file journal 148, metadata database 146, content directory 144, content storage 142, account database 140, etc. as appropriate.

When synchronizing from content management system 110 to client device 150, a modification, addition, deletion, move of a content item recorded in server file journal 148 can trigger a notification to be sent to client device 150 using notification service 117. When client device 150 is informed of the change to server file journal 148, client device can check storage index 164 to determine if the time stamp of the change occurred since the last synchronization, or determine if the specific change has been synchronized. When client device 150 determines that it is out of synchronization with content management system 110, content item synchronization service 156 requests content item blocks including the changes, and updates its local copy of the changed content items. In some embodiments, notification service can query other services or databases of content management system 110 such as server file journal 148 to gain more context for the notification, to determine if a notification can be batched with another notification or to supplement a notification Sometimes client device 150 might not have a network connection available. In this scenario, content item synchronization service 156 can monitor the linked collection for content item changes and queue those changes for later synchronization to content management system 110 when a network connection is available. Similarly, a user can manually start, stop, pause, or resume synchronization with content management system 110.

Content item synchronization service 156 can synchronize all content associated with a particular user account on content management system 110. Alternatively, content item synchronization service 156 can selectively synchronize a portion of the content of the total content associated with the particular user account on content management system 110. Selectively synchronizing only a portion of the content can preserve space on client device 150 and save bandwidth.

In some embodiments, content item synchronization service 156 selectively stores a portion of the content associated with the particular user account and stores placeholder content items in client storage for the remainder portion of the content. For example, content item synchronization service 156 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 156 can retrieve the data of the content item from content management system 110 and provide the complete content item to accessing client device 150. This approach can provide significant space and bandwidth savings while still providing full access to a user's content on content management system 110.

Content Rendering Features

Web interface service 124 can provide a web interface, such as a web site, for client device 150 to access content and features from content management system 110. For example, web interface service 124 can provide a web interface for client device 150 to interact with content items in content storage 142 (e.g., view, edit, delete, add, share, upload, download, etc.), access user accounts in account database 140 and account features, access web pages hosted by content management system 110, collaborate with other users in content management system 110, etc. In some cases, web interface service 124 can include one or more web servers hosting one or more web sites, web pages, and/or Internet content.

Content preview service 130 can interface with web interface service 124 to provide content to client device 150. Content preview service 130 can rendering functionalities for server-side rendering of content provided to client device 150 via web interface service 124. For example, content preview service 130 can render one or more content items in a web page from web interface service 124 and/or generate a preview of the one or more content items in the web page. In some cases, content preview service 130 can convert a content item to a preview format and/or render the content item for presentation to client device 150 through web interface service 124. To illustrate, content preview service 130 can convert a file, such as a PDF file, to an image and/or text format that can be rendered and presented in a web page from web interface service 124.

Content preview service 130 can handle requests from client device 150 to web interface service 124 for content item previews, as well as any other server-side rendering requests. Content preview service 130 can manage content item previews, rendering requests, and rendering results. For example, content preview service 130 can manage security and authentication for rendering requests, caching of rendering results, generation of rendering results, delivery and/or presentation of rendering results, etc.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing content via sharing service 128. Sharing content by providing a link to the content can include making the content item accessible from any computing device in network communication with content management system 110. However, in some embodiments a link can be associated with access restrictions enforced by content management system 110. Sharing content can also include linking content using sharing service 128 to share content within content management system 110 with at least one additional user account (in addition to the original user account associated with the content item) so that each user account has access to the content item. The additional user account can gain access to the content by accepting the content, which will then be accessible through either web interface service 124 or directly from within the directory structure associated with their account on client device 150. The sharing can be performed in a platform agnostic manner. That is, the content can be shared across multiple client devices 150 of varying type, capabilities, operating systems, etc. The content can also be shared across varying types of user accounts.

To share a content item within content management system 110 sharing service 128 can add a user account identifier to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145.

To share content items outside of content management system 110, sharing service 128 can generate a custom network address, such as a uniform resource locator (URL), which allows any web browser to access the content item or collection in content management system 110 without any authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110, which can use the received content identification data to identify the appropriate content item and return the content item.

In addition to generating the URL, sharing service 128 can also be configured to record in access control list database 145 that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, i.e., from within a corporate network domain.

In some embodiments, sharing service 128 can also be configured to deactivate a generated URL. For example, each content entry can also include a URL active flag indicating whether the content should be returned in response to a request from the generated URL. For example, sharing service 128 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing service 128 can reactivate the URL by again changing the value of the URL active flag to 1 or true. A user can thus easily restore access to the content item without the need to generate a new URL.

In some embodiments, content management system 110 can designate a URL for uploading a content item. For example, a first user with a user account can request such a URL, provide the URL to a contributing user and the contributing user can upload a content item to the first user's user account using the URL.

Events

Content management system 110 can track, create, and store events involving content items and/or user activity. For example, when a user interacts with a content item (e.g., add, edit, post, share, delete, comment, move, rename, etc.) and/or interacts with another user (e.g., message, comment, collaborate, etc.), event service 118 can generate an event for such interaction. When event service 118 detects a user interaction with a content item and/or another user, event service 118 can create an event identifier (e.g., unique event identifier) and event type, and associate the event identifier and event type with the user (e.g., user identifier and namespace identifier) to create an event or event record for the interaction. After the event is created, event service 118 can send the event identifier and any information associated with the event to events 143 for storage.

Events 143 can include one or more storage systems, such as one or more databases, for storing events and associated information. In some examples, events 143 can include a distributed database or distributed storage system. Events 143 can receive and store the event data for access by content management system 110.

Presence and Seen State

Content management system 110 can provide information about how users are interacting or have interacted with a content item, such as a shared content item. Content management system 110 can report that a user whom which a content item is shared is currently viewing the content item. For example, client collaboration service 160 can notify notifications service 120 when client device 150 is accessing the content item. Notify notifications service 120 can notify client devices of other users having access to the same content item of the presence of the user of client device 150 with respect to the content item. Content management system 110 (e.g., event service 118) and/or client device 150 can track user interactions with content, such as read or write events, and maintain a history of such events and interactions for a user (e.g., events 143).

Content management system 110 can report a history of user interactions with a shared content item. Collaboration content management service 126 can query data sources such as events 143, metadata database 146, and server file journal 148 to determine that a user has saved the content item, that a user has yet to view the content item, etc., and disseminate this status information using notification service 117 to other users so that they can know who currently is or has viewed or modified the content item.

Collaboration content management service 126 can facilitate comments associated with content, even if a content item does not natively support commenting functionality. Such comments can be stored in metadata database 146.

Collaboration content management service 126 can originate and transmit notifications for users. For example, a user can mention another user in a comment and Collaboration content management service 126 can send a notification to that user that he has been mentioned in the comment. Various other content item events can trigger notifications, including deleting a content item, sharing a content item, etc.

Collaboration content management service 126 can provide a messaging platform whereby users can send and receive instant messages, voice calls, emails, etc.

Collaboration Content Items

Collaboration content management service 126 can also provide an interactive content item collaboration platform whereby users can simultaneously create collaboration content items, comment in the collaboration content items, and manage tasks within the collaboration content items. Collaboration content items can be files that users can create and edit using a collaboration content item editor, and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments this can be managed by requiring two users access a content item through a web interface and there they can work on the same copy of the content item at the same time.

Collaboration Companion Interface.

In some embodiments client collaboration service 160 can provide a native application companion interface for the purpose of displaying information relevant to a content item being presented on client device 150. In embodiments wherein a content item is accessed by a native application stored and executed on client device 150, where the content item is in a designated location of the file system of client device 150 such that the content item is managed by content application 152, the native application may not provide any native way to display the above addressed collaboration data. In such embodiments, client collaboration service 160 can detect that a user has opened a content item, and can provide an overlay with additional information for the content item, such as collaboration data. For example, the additional information can include comments for the content item, status of the content item, activity of other users previously or currently viewing the content item. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user. For example, a software package such as an application running on client device 150, can programmatically make API calls directly to content management system 110 when a user provides authentication credentials, to read, write, create, delete, share, or otherwise manipulate content.

A user can view or manipulate content stored in a user account via a web interface generated and served by web interface service 124. For example, the user can navigate in a web browser to a web address provided by content management system 110. Changes or updates to content in the content storage 160 made through the web interface, such as uploading a new version of a content item, can be propagated back to other client devices associated with the user's account. For example, multiple client devices, each with their own client software, can be associated with a single account and content items in the account can be synchronized between each of the multiple client devices.

Client device 150 can connect to content management system 110 on behalf of a user. A user can directly interact with client device 150, for example when client device 150 is a desktop or laptop computer, phone, television, internet-of-things device, etc. Alternatively or additionally, client device 150 can act on behalf of the user without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via browser application 162. Browser application 162 can be a web browser that resides on client device 150 and is configured to communicate with content management system 110. In various implementations, the client-side application 152 can present a user interface (UI) for a user to interact with content management system 110. For example, the user can interact with the content management system 110 via file system extension 153 integrated with the file system or via a webpage displayed using browser application 162.

Browser application 162 can include plug-ins and/or engines for viewing and previewing different types of content. For example, browser application 162 can include a PDF previewer for displaying previews or renderings of PDF files. Browser application 162 can also include logic for receiving and displaying content from content management system 110, executing instructions from content management system 110, sending and receiving data to and from content management system 110, etc.

In some embodiments, client application 152 can be configured to manage and synchronize content for more than one account of content management system 110. In such embodiments client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 1B:
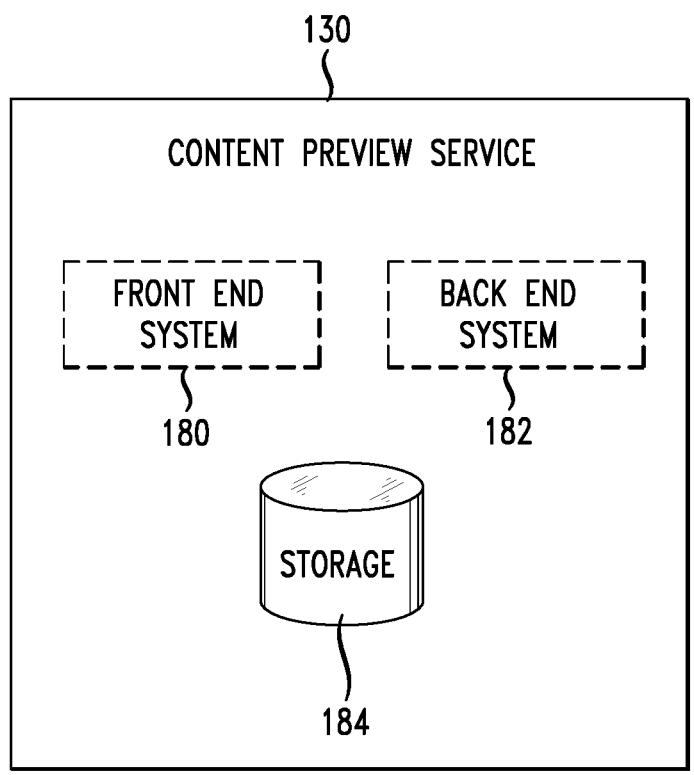
FIG. 1B illustrates a block diagram of an example architecture of a content preview service.

FIG. 1B illustrates a block diagram of an example architecture of content preview service 130. Content preview service 130 can include front-end service 180 and back-end service 182. Front-end service 180 can communicate with back-end service 182 to generate results for rendering requests from client device 150, and communicate with web interface 124 to receive the rendering requests from client device 150 and deliver the rendering results from back-end service 182.

Front-end service 180 can manage rendering requests from web interface service 124 and/or client device 150 (e.g., authenticate rendering requests, validate rendering requests, route rendering requests, approve or reject rendering requests, etc.), cache and manage data and results associated with rendering requests (e.g., cache rendering results such as file previews, cache rendering requests, cache passwords or security tokens, cache file settings, update or modify cached data, etc.), enforce security features of rendered results (e.g., file passwords, etc.), decrypt rendering results, generate security tokens for rendering requests, send rendering requests to back-end service 182, etc.

For example, front-end service 180 can receive rendering requests from web interface service 124, perform a cache lookup for rendering requests (e.g., query storage 184 for cached rendering requests, rendering results, security information or tokens, etc.), validate a password associated with the rendering requests or generate a password error, and forward the rendering request to back-end service 182. Front-end service 180 can receive rendering results from back-end service 182, decrypt the rendering results, deliver the rendering results to web interface service 124 for client device 150, and cache data associated with the rendering requests (e.g., rendering results, rendering requests, passwords or tokens, etc.), etc.

Back-end service 182 can generate rendering results for rendering requests from front-end service 180, encrypt the rendering results, and send the rendering results (e.g., encrypted and/or unencrypted) back to front-end service 180. To generate rendering results, back-end service 182 can render content items and/or previews for the rendering requests and provide the rendered content items and/or previews to front-end service 180. In some cases, back-end service 182 can perform bytes conversion to convert content items from one format to another format for preview rendering. For example, back-end service 182 can convert a PDF file to an image format, such as portable network graphics (PNG), and render the converted file. The converted file (e.g., PNG) can provide a preview of the PDF file. Back-end service 182 can send the converted file to front-end service 180 as a rendering result. For security, back-end service 182 can encrypt the rendering results with a key, such as a password associated with the rendering request, the rendering request, and/or a data structure generated from a password associated with the rendering request and/or the rendering request itself.

Back-end service 182 can perform one or more conversions of a content item to transform the content item from an original format to a target format. In some cases, the content item can be converted directly from the original format to the target format. However, in some cases, the content item can be converted from the original format to one or more intermediate or transition formats before converting the content item to the target format. For example, to convert a content item from format A to format C, back-end service 182 can first convert the content item from format A to format B and then convert the content item from format B to format C. Back-end service 182 can include logic and rules for determining how to convert a content item from an original format to a target format, including any intermediate or transition conversions necessary for the target format.

The rendering result generated by back-end service 182 can include an image layer and/or a text layer. For example, the rendering result can include an image (e.g., PNG) and text data such as metadata and/or text from the original content item. As another example, the rendering result can be an image file which provides a graphical view of the original content item. The image and/or text layer can provide a content item preview which can be displayed on a web page for client device 150.

Storage 184 can store or cache rendering results as well as information associated with rendering requests. For example, storage 184 can include a cache of rendering results stored by front-end service 180. Front-end service 180 can use the cached rendering results for future requests for the rendering results in order to avoid having to generate the rendering results multiple times. When front-end service 180 receives a rendering request, it can perform a cache lookup in storage 184 to determine if the rendering results for that particular request are already available and, if so, provide the rendering results from storage 184 without having to request new rendering results from back-end service 182. This can greatly reduce delays and the processing burden of rendering content previews and results.

In some cases, storage 184 can store rendering results in encrypted form for security purposes. The rendering results can be encrypted, without limitation, with a password, a token, a key, the rendering request itself, a data structure generated for the rendering request and password associated with the rendering results, etc., as further described below.

Storage 184 can also store rendering requests received from client device 150. For example, storage 184 can store every valid (and/or invalid) rendering request received from client device 150, including any associated information such as a password, token, content item information, timestamp, formatting information, properties, etc. Front-end service 180 can use cached requests and associated information to service subsequent, related requests. For example, when front-end service 180 receives a new rendering request, it can perform a cache lookup at storage 184 to determine if a matching request has previously been cached. Based on whether a matching request has been previously cached, front-end service 180 can determine whether to validate the request, generate an error, forward the request, request back-end service 182 to attempt to generate a rendering result, provide an existing rendering result, etc.

Storage 184 can store passwords, tokens, and/or security or authorization information associated with rendering requests and results. Front-end service 180 can use cached passwords, tokens, and/or authorization data to validate rendering requests, encrypt rendering requests and/or data associated with rendering requests, decrypt cached rendering results, etc.

Figure 2A:
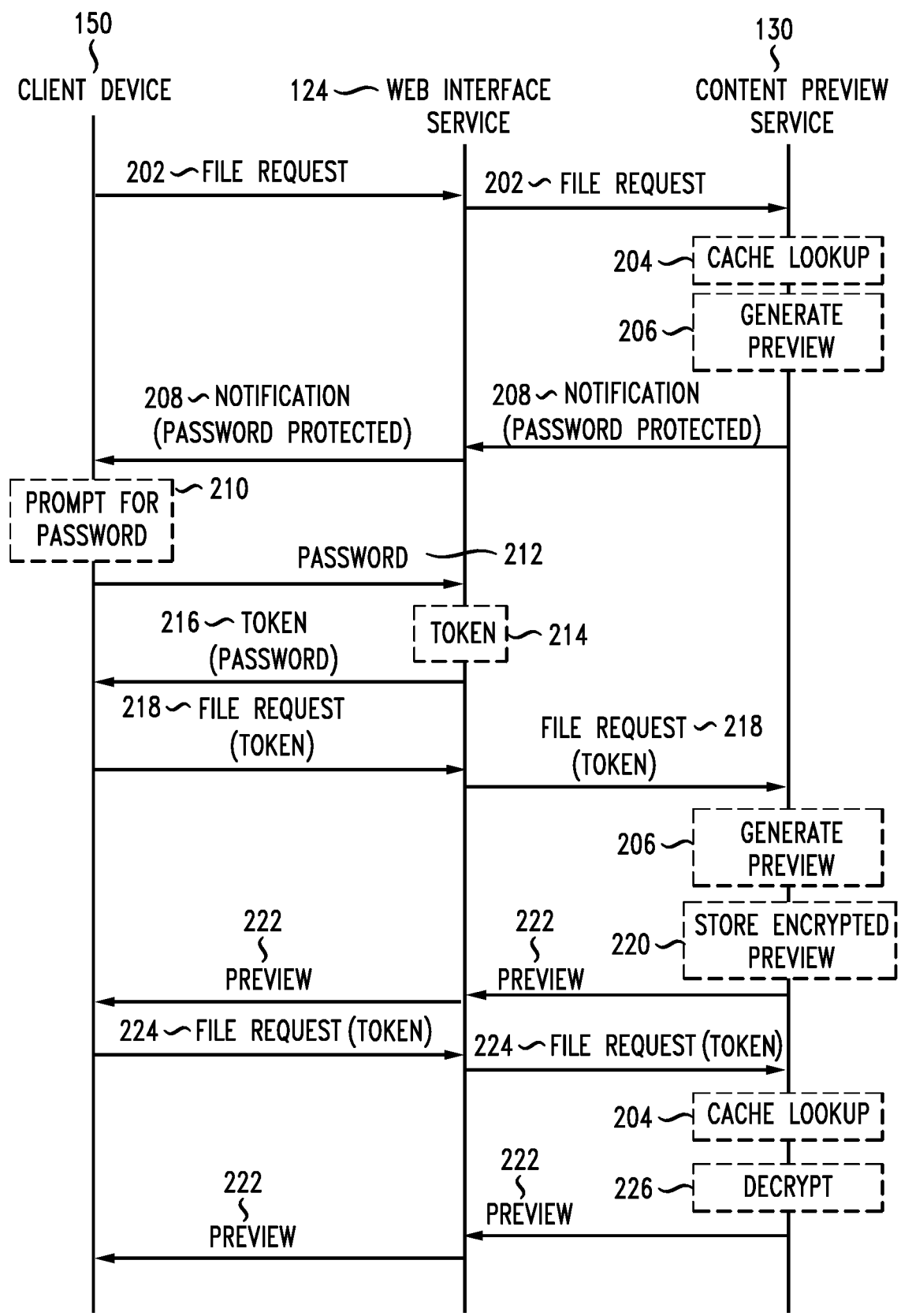
FIG. 2A illustrates a diagram of an example process for server-side rendering of password-protected files.

FIG. 2A illustrates a diagram of an example process for server-side rendering of password-protected files. In this example, client device 150 sends file request 202 to web interface service 124 for a password protected file in content storage 142, such as a password protected PDF (printable document format). For example, client device 150 can browse one or more web pages of content management system 110 accessed by client device 150 from web interface service 124 via a browser application (e.g., web browser) on client device 150. The one or more web pages may include a password-protected file that client device 150 wishes to access. File request 202 can request a preview or rendering of the password-protected file. For example, file request 202 can include an address associated with the password-protected file (e.g., URL) and a request for an image and/or text file rendering the content in the password-protected file (e.g., /ExamplePDF/text, ExamplePDF/image, etc.).

Web interface service 124 receives file request 202 from client device 150 and forwards file request 202 to content preview service 130. Content preview service 130 can receive file request 202 and perform cache lookup 204 (e.g., storage 184) to determine if a result for file request 202 (e.g., preview or rendering of the password-protected file) is already available from a previous request. As further described below, at cache lookup 204, content preview service 130 can also check whether the cache contains a previous determination that the file is password protected and, if so, determine if file request 202 includes the proper password for the file if the file is password protected.

If a cached result is available, content preview service 130 can proceed with the cached result as further described below. If content preview service 130 determines from cache lookup 204 that the file is password protected and file request 202 does not include the proper password, content preview service 130 can proceed with notification 208 as further described below. If a cached result is not available and content preview service 130 does not have a cached indication that the file is password protected, content preview service 130 can proceed with preview generation 206. In FIG. 2A, file request 202 does not include a password for the file and cache lookup 204 does not yield a cached result or an indication that the file is password protected. Accordingly, after cache lookup 204, content preview service 130 proceeds to initiate preview generation 206. Content preview service 130 can attempt to generate a preview or rendering of the password-protected file at preview generation 206.

In this example, file request 202 does not include the password for the password-protected file. Therefore, at preview generation 206, content preview service 130 will detect an error caused by the missing password, and generate notification 208 indicating that the file requested in file request 202 is password protected. Content preview service 130 then sends notification 208 to web interface service 124, which forwards notification 208 to client device 150. Notification 208 can include a header and/or string that indicates to client device 150 that a password is needed for the file associated with file request 202. Content preview service 130 can also cache or store an indication that the file is password protected, which content preview service 130 can use for future requests to determine during cache lookup 204 that the file is password protected.

Client device 150 receives notification 208 from web interface service 124. Notification 208 can trigger prompt 210 at client device 150, requesting a password to access the password-protected file. For example, notification 208 can trigger a browser application at client device 150 to display a web page with prompt 210 where a user at client device 150 can provide a password for the file.

When the user at client device 150 provides a password for the file through prompt 210, client device 150 (e.g., browser application at client device 150) sends password message 212 to web interface service 124. Password message 212 includes the password provided in prompt 210. Web interface service 124 receives password message 212 and initiates token generation 214, to generate a token. The token can be generated from the password in password message 212, and used to authenticate current and future requests for access to the password-protected file. Moreover, the token can be encrypted for security purposes.

Web interface service 124 sends token 216 to client device 150. Web interface service 124 can also cache a copy of token 216 for future use. Client device 150 receives token 216 and sends file request 218 to web interface service 124.

File request 218 can include token 216 which authenticates file request 218. For example, file request 218 can identify the file requested as described with respect to file request 202, and include token 216 which supplies the password for the password-protected file requested.

Web interface service 124 receives file request 218 and forwards it to content preview service 130. Content preview service 130 can again initiate preview generation 206 for the requested file. However, in some cases, before initiating preview generation 206, content preview service 130 can again perform cache lookup 204 in response to receiving file request 218. At cache lookup 204, content preview service 130 can check if a cached result is available and verify that file request 218 includes the proper password for the cached result. If the cached result is available, the cached result can be encrypted for security and the password associated with file request 218 can be used to decrypt the cached result. If the password fails to decrypt the cached result, content preview service 130 can determine that the password provided is wrong.

If a cached result is not available, content preview service 130 can obtain the password from token 216 in file request 218 and use the password to authorize file request 218, access the password-protected file associated with file request 218, and perform preview generation 206 to generate preview 222 for the password-protected file. If the password is correct, content preview service 130 can complete preview generation 206 without a password error and obtain preview 222 which provides a preview or rendering result for the password-protected file. Preview generation 206 can include a process of converting the password-protected file from an original format to a target format which provides a rendering or preview of the password-protected file that can be displayed at client device 150 (e.g., on a web page). The conversion process for preview generation 206 is further described below with reference to FIGS. 3A and 3B.

Content preview service 130 can store preview 222 for future use. By storing preview 222, when content preview service 130 receives a subsequent request for preview 222, content preview service 130 can check the cache or storage for preview 222 during cache lookup 204 and avoid having to again generate preview 222 if it finds a cached copy of preview 222. When storing preview 222, content preview service 130 can encrypt preview 222 and stored preview 222 in encrypted form. In some cases, content preview service 130 can encrypt preview 222 based on file request 218 and/or token 216. For example, content preview service 130 can encrypt preview 222 with the password associated with token 216, the file request itself (218), or any key or data structure generated based on file request 218, token 216, and/or the password associated with token 216.

If preview generation 206 involves multiple stages of conversions, as further described below with reference to FIGS. 3A and 3B, content preview service 130 can store the final representation of the file (e.g., preview 222) as well as any intermediate representation of the file. For example, if preview generation 206 involves first converting a PDF file to a first image file and subsequently converting the first image file to one or more second image files, content preview service 130 can store an encrypted version of the first image file and an encrypted version of the one or more second image files. To illustrate, content preview service 130 can convert a PDF file to a large image file and subsequently convert the large image file into smaller images or thumbnails and store both the encrypted large image file and the encrypted smaller images or thumbnails. Content preview service 130 can thus generate multiple thumbnail resolutions for the same large image file, provided that each file request has the correct password as further described below. This way, content preview service 130 may only need to convert the PDF to the large image file once. Moreover, for security, each derivative or conversion can be stored in encrypted form. As further explained below, this guarantees that no derivatives of password-protected content can be accessed without supplying the correct password for each request of a derivative.

Content preview service 130 can send preview 222 to web interface service 124, and web interface service 124 can provide preview 222 to client device 150. Client device 150 can receive preview 222 and display preview 222 via a local application, such as a web browser. Preview 222 can display the contents of the password-protected file in a rendered format, such as image and/or text format. Content preview service 130 and web interface service 124 can thus provide server-side rendering of the password-protected file for client device 150, enabling client device 150 to preview the file despite the password protection, without compromising the security provided by password protection.

Content preview service 130 can also use cached data to quickly process subsequent requests for the password-protected file and respond without having to re-generate preview 222. For example, client device 150 sends a subsequent request, file request 224, to web interface service 124 for the password-protected file. In this example, file request 224 includes token 216 previously obtained by client device 150 to provide the password for the file. Web interface service 124 receives file request 224 and forwards it to content preview service 130. Content preview service 130 receives file request 224 and performs cache lookup 204 based on file request 224. Based on cache lookup 204, content preview service 130 can determine that preview 222 is available from a previous request and response, and can be provided as a response to file request 224. Content preview service 130 can obtain preview 222 from cache and respond to file request 224 with a copy of preview 222, without having to perform preview generation 206. Web interface service 124 can receive preview 222 and provide it to client device 150 for presentation to the user.

If the stored or cached copy of preview 222 is encrypted, content preview service 130 can retrieve the encrypted copy of preview 222 and decrypt 226 the encrypted copy of preview 222 before responding to file request 224 from client device 150. Content preview service 130 can decrypt an encrypted copy of preview 222 using file request 224. For example, content preview service 130 can retrieve the password of the file and/or token 216 from file request 224 and use the password and/or token to decrypt the encrypted copy of preview 222. As another example, content preview service 130 can decrypt the encrypted copy of preview 222 using file request 224 and/or a data structure created based on file request 224, token 216, and/or the password of the file for encrypting/decrypting preview 222.

Figure 2B:
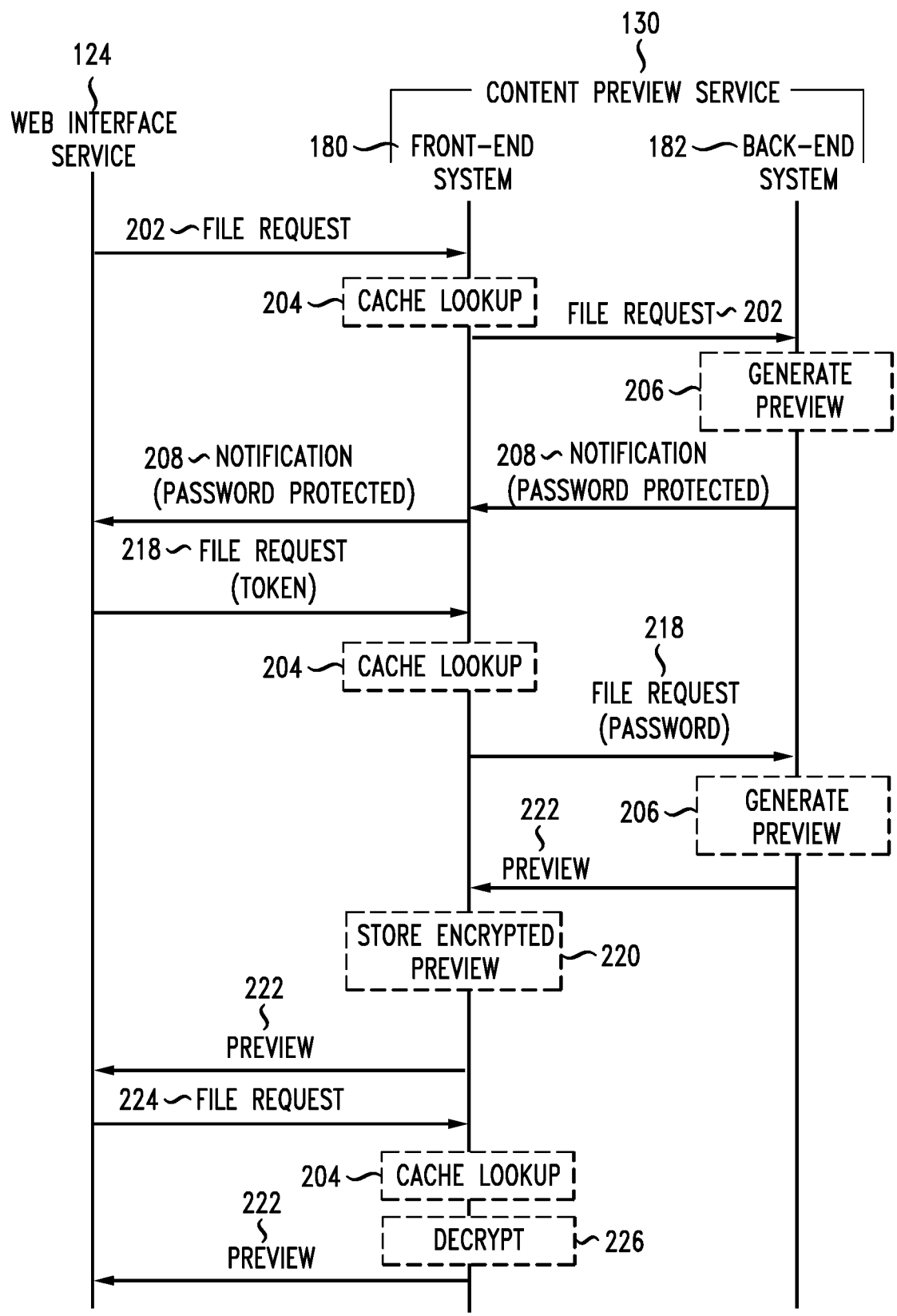
FIG. 2B illustrates a diagram of example backend operations for the server-side rendering process shown in FIG. 2A.

FIG. 2B illustrates a diagram of example back-end operations for the server-side rendering process shown in FIG. 2A. This example illustrates interactions and operations between web interface service 124, front-end service 180 of content preview service 130, and back-end service 182 of content preview service 130.

After receiving file request 202 from client device 150 as previously shown in FIG. 2A, web interface service forwards file request 202 to front-end service 180 of content preview service 130. Front-end service 180 receives file request 202 and performs cache lookup 204. Through cache lookup 204, front-end service 180 can check if preview 222 of the file requested in file request 202 is in cache. Front-end service 180 can also check the cache (e.g., storage 184) for a cached copy of file request 202, the password for the file requested in file request 202, a token generated for the password, etc.

In this example, file request 202 is an initial request for the password-protected file, and the password-protected file has not been previously rendered or converted. Accordingly, the password-protected file or a rendering thereof (e.g., preview 222) is not in the cache and cache lookup 204 does not yield a hit. After cache lookup 204, front-end service 180 sends file request 202 to back-end service 182 to generate preview 222 for the password-protected file. Back-end service 182 receives file request 202 and attempts preview generation 206 to generate a preview for the password-protected file (e.g., convert the password-protected file). Without a password included in file request 202 for the password-protected file, back-end service 182 does not complete preview generation 206. Instead, back-end service 182 determines that file request 202 does not include a password for the password-protected file, and issues notification 208 indicating that the file is password protected. Back-end service 182 sends notification 208 to front-end service 180, which forwards notification 208 to web interface service 124.

In some examples, front-end service 180 can cache notification 208 and/or the previous determination that the file is password protected. Thus, when front-end system 180 receives a request for the file, front-end system 180 can check the cache and determine that a password is required. Front-end system 180 can determine that a password is required even if a preview was not previously generated by back-end system 182 for the file. If the request for the file (e.g., 202) does not include the password or token for the file, front-end system 180 can check the cache and return a password protected status (e.g., notification 208) for client device 150 without having to send a request to back-end system 182 or otherwise have back-end system 182 generate notification 208.

If the request for the file does include a password or token for the file, front-end system 180 can use the password or token in the request to check the cache and determine whether the password or token is correct. For example, if front-end system 180 performs a cache lookup (e.g., 204) and determines a cached version of the file exists, front-end system 180 can use the password or token to attempt to decrypt the cached version of the file. If the password or token is wrong, front-end system 180 will be unable to decrypt the cached version of the file. Front-end system 180 can thus detect the password error without having to send a request to back-end system 182. If the password or token is correct, front-end system 180 can decrypt the cached version of the file and respond to the file request with preview 222, without having to contact back-end system 182.

In some aspects, front-end system 180 can cache the actual password or token of a protected file and use the cached password or token to verify a password provided in a request for the file. However, for security reasons, in other aspects, front-end system 180 may not cache a copy of the actual password or token. Instead, front-end system 180 can cache the encrypted version of the file (e.g., preview 222) and use the password or token in a file request to attempt to decrypt the cached, encrypted version of the file, as previously explained. If the decryption fails, front-end system 180 can determine that the password or token used to decrypt the cached file is wrong. Accordingly, even if a malicious user is able to access the cached content (e.g., encrypted preview 222 and/or related metadata), the malicious user will be unable to obtain the password or decrypt the content. Moreover, for security, front-end system 180 can be configured to prevent a preview or any version of a password-protected file from being returned to client device 150 if a proper password or token is not supplied and verified as described herein.

When web interface service 124 receives file request 218, which includes token 216 containing and/or representing the password for the password-protected file, it forwards file request 218 to front-end service 180. Front-end service 180 retries cache lookup 204 based on file request 218. Front-end service 180 can again check if the rendered file or preview, the password for the file, and/or token 216 are in the cache. In this example, cache lookup 204 does not yield a hit. Accordingly, front-end service 180 sends file request 218 to back-end service 182. Front-end service 180 can request the file from back-end service 182 send the password and/or token 216 in file request 218 for back-end service 182 to use when generating the preview or rendering of the file.

Back-end service 182 receives file request 218 and again attempts to generate a preview of the file in preview generation 206. This time, with token 216 in file request 218 and/or the password in token 216, back-end service 182 is able to generate preview 222 for the password-protected file. Back-end service 182 can verify the password or token 216 in file request 218 is correct and allows access to the password-protected file, and convert the password-protected file to preview 222. Back-end service 182 then sends preview 222 created at preview generation 206 to front-end service 180.

Front-end service 180 receives preview 222 and stores encrypted preview 220 at storage 184 for future cached access. Front-end service 180 can also store file request 218, token 216 in file request 218, the password retrieved from file request 218 and/or token 216, and/or an encryption key used to decrypt cached data (e.g., file request 218, preview 222, etc.) for future requests.

Front-end service 180 then sends a decrypted copy of preview 222 to web interface service 124, which can forward the decrypted copy of preview 222 to client device 150 in response to file request 218 from client device 150. In some cases, front-end service 180 receives preview 222 from back-end service 182 in encrypted form, and stores preview 222 on the cache (e.g., storage 184) in encrypted form for security. Front-end service 180 can decrypt the encrypted copy of preview 222 using a key generated for decrypting preview 222. The key can be the password for the password-protected file associated with preview 222, the file request (218), the token (216) from the file request (218), or any data or structure generated based on the password, the file request (218), and/or the token (216) for decrypting preview 222.

In some cases, any portion of file request 218, including the entire request, can be used as a key to encrypt and/or decrypt preview 222. For example, the request itself (218) including token 216 can be used to encrypt or decrypt preview 222. In some cases, file request 218, token 216, and/or the password associated with token 216 can be used to generate a tree structure for each file request which can be used as the password for the associated file request. The tree structure can include one or more nodes as well as cached data for each file request, such as cached rendering results (e.g., preview 222) for each file request. The tree structure and contents within the tree structure can then be used as a password for specific file requests. This mechanism can be used to create different passwords for the different portions of the preview generation process, while ensuring that all passwords generated are derived from the original file request (e.g., file request 218) and password.

When web interface service 124 receives a subsequent request for preview 222, such as file request 224, it forwards the request (224) to front-end service 180. Front-end service 180 receives file request 224 and performs cache lookup 204. In this case, since preview 222 and token 216 were previously cached by front-end service 180, cache lookup 204 will yield a match for preview 222 and token 216 (or the password contained in token 216). Front-end service 180 can use token 216 in file request 224 to verify that file request 224 includes the proper password for the password-protected file, retrieve preview 222 from cache, and send a decrypted copy of preview 222 back to web interface service 124. For example, front-end service 180 can decrypt 226 preview 222 based on token 216 in file request 224, and send the decrypted copy of preview 222 to web interface service 124. Front-end service 180 can thus provide preview 222 in response to file request 224 without triggering preview generation 206 from back-end service 182 to again generate preview 222.

Figure 3A:
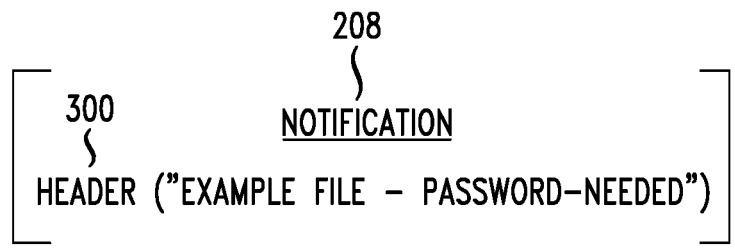
FIG. 3A illustrates an example of notification for indicating to a client device that a requested file is password protected.
Figure 3B:
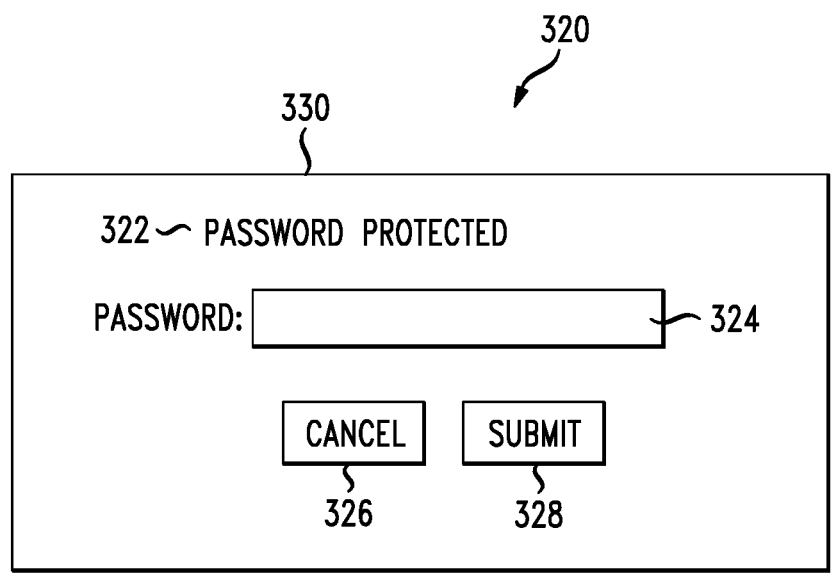
FIG. 3B illustrates an example display prompt requesting input of a password for a password-protected file.

FIG. 3A illustrates an example of notification 208 for indicating to client device 150 that a requested file is password protected. Notification 208 can be generated by content preview service 130 and sent to client device 150 as previously described, to inform client device 150 that a password is required for the requested file and prompt client device 150 to supply the password.

Header 300 in notification 208 can include a string or value that indicates that a password is needed for a particular file requested. Header 300 can be, for example, a portion of a packet header, such as an HTTP (hypertext transfer protocol) header, communicated to client device 150. In some cases, header 300 can include an authorization error status, such as HTTP status code 401.

Upon receipt by client device 150, notification 208 can trigger client device 150 to display a prompt for a user requesting input of the password. For example, with reference to FIG. 3B, notification 208 can trigger password prompt 320 at client device 150. Password prompt 320 can include interface 330 for requesting a password from the user. Interface 330 can be a modal dialog, for example.

Interface 330 can display request 322 for a password to access the requested file. Interface 330 can also include password input field 324 which enables a user to supply a password for the file. Interface 330 includes controls 326, 328 to cancel password prompt 320 or submit an input entered in password input field 324. When a password entered in password input field 324 is submitted via control element 328, client device 150 can receive the password entered in password input field 324 and send the password to web interface service 124 in a new request for the password-protected file. The password can be received by content preview service 130 and used as previously described, to generate a token and/or attempt to generate a preview for the password-protected file.

Figure 4:
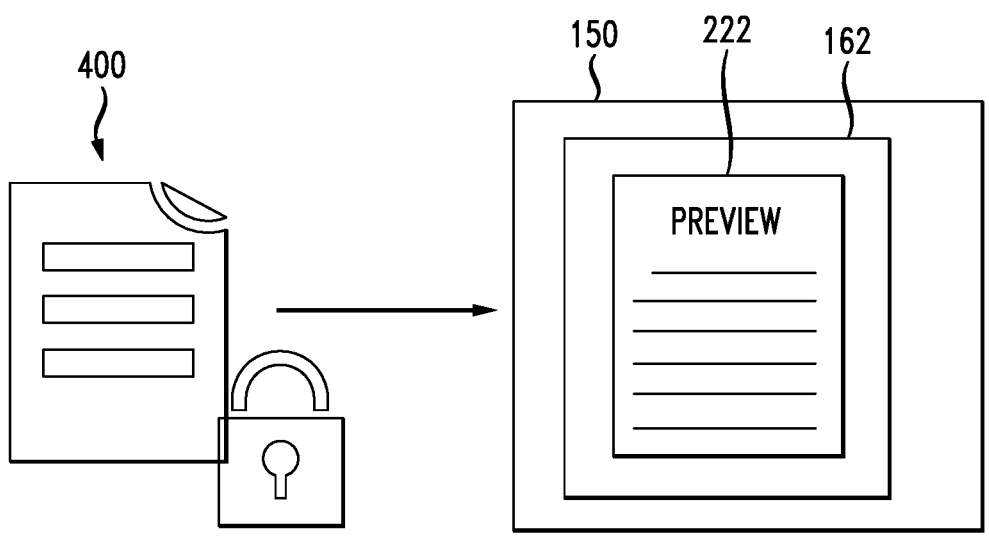
FIG. 4 illustrates an example preview rendering on a client device.

FIG. 4 illustrates an example preview rendering on client device 150. In this example, file 400 is a password-protected file, such as a password-protected PDF, requested by client device 150 from web interface service 124. File is thus configured with a password that is required to view and access file 400. The password can be a password defined for file 400 by a user to protect or secure the content of file 400 from unauthorized access. The password defined for file 400 prevents display and rendering of file 400 without the password.

Through a server-side rendering process as described herein, content preview service 130 can obtain the password for file 400 and generate preview 222 for file 400. Preview 222 can be an image and/or text rendering of file 400, including the contents of file 400. Preview 222 can be generated and provided by content preview service 130 to client device 150. Client device 150 can receive and display preview 222 for a user at client device 150. Client device 150 can display preview 222 on browser application 162 at client device 150. For example, assume file 400 is a password-protected PDF and preview 222 is a PDF preview of file 400. Client device 150 can receive the PDF preview (e.g., preview 222) from content preview service 130 and display the PDF preview via browser application 162 and/or a PDF viewer on client device 150.

The software application used at client device 150 to display preview 222 can depend on the format of preview 222, which can vary in different examples. Content preview service 130 can be configured to convert a password-protected file from one format to various target formats as required for a particular request or client.

Figure 5A:
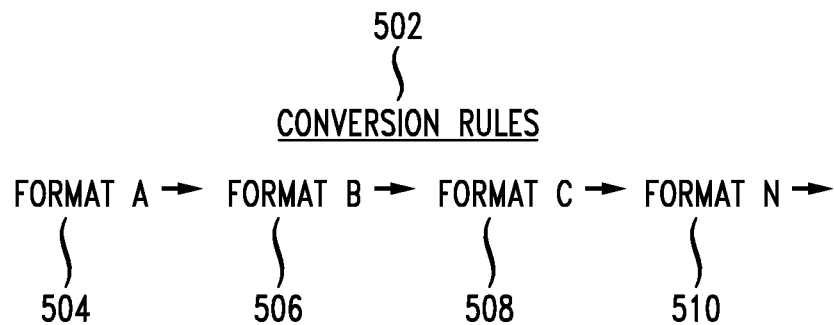
FIG. 5A illustrates conversion rules for converting password-protected files from an original format to one or more target formats.

FIG. 5A illustrates conversion rules 502 for converting password-protected files from an original format to one or more target formats. Some file formats can be directly converted to one or more file formats. However, in many cases, such file formats cannot be directly converted into one or more other formats. Formats that are capable of direct conversion can be leveraged to perform indirect conversions into other formats that may not otherwise be directly converted from those formats. Conversion rules 502 define which formats can be generated through direct conversions and which formats require indirect conversions. Conversion rules 502 can also define the sequence of conversions for direct and indirect conversions. Thus, conversion rules 502 define rules for converting a file from one format to almost any target format, either through direct conversion or indirect conversion.

In this example, a file can be converted from any of formats 504, 506, 508, 510 to any other of formats 504, 506, 508, 510 based on conversion rules 502. For example, assume format 504 represents an original format of a file and formats 506, 508, 510 represent possible, target formats for the file. Conversion rules 502 provide a sequence of format conversions that can be used to convert the file from format 504 to format 506, 508, or 510.

If the target format of a file is format 510 and the original format is format 504, conversion rules 502 provide that format 504 be first converted to format 506 and the converted file in format 506 be then converted to format 508. The converted file in format 508 can then be converted to format 510, resulting in a conversion of the file from format 504 to format 510. On the other hand, if the target format of a file is format 508 and the original format is format 506, conversion rules 502 provide that the file can be converted directly from format 506 to format 508. In this way, the number and sequence of conversions when converting a file from one format to another according to conversion rules 502 can depend on the original format of the file and the target format of the file.

Formats 504, 506, 508, 510 can represent any file format, such as PDF, DOC, JPEG, PNG, JSM, etc. Assume format 504 is DOC, format 506 is PDF, format 508 is PNG, and format 510 is JPEG. In this example, conversion rules 502 allow a file to be converted from DOC (504) to PDF (506), from PDF (506) to PNG (508), and from PNG (508) to JPEG (510). Thus, a file can start as a DOC file and be converted to a JPEG file, for example, based on conversion rules 502.

Figure 5B:
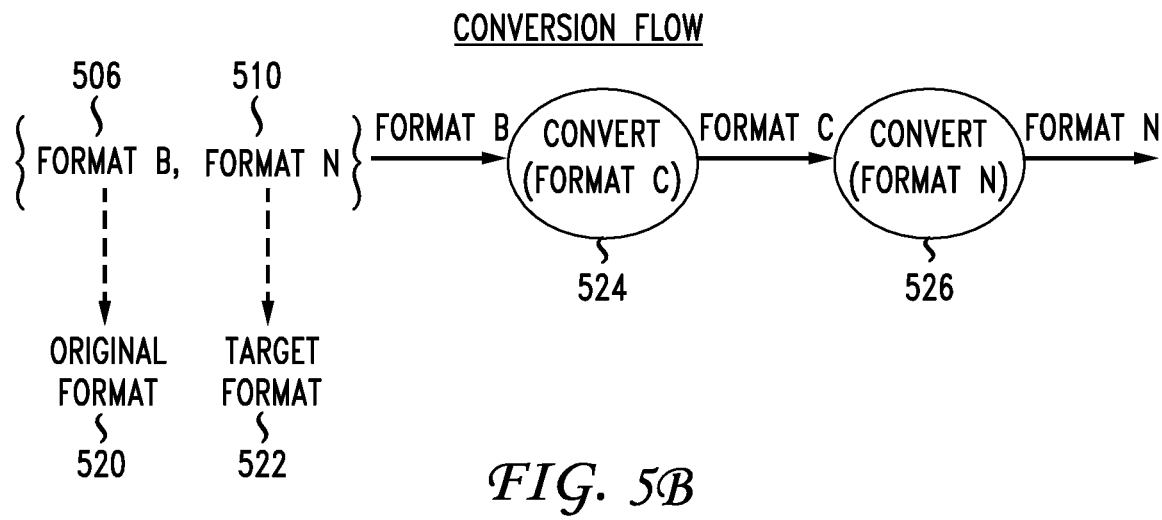
FIG. 5B illustrates an example flow for converting a file from an original format to a target format.

FIG. 5B illustrates an example flow for converting a file from an original format (520) to a target format (522). In this example, a content item is converted from original format 520 represented by as format B (506), to target format 522 represented by format N (510). Format B (506) can represent the format of a content item identified in a content item request (e.g., file request 202) from client device 150. Target format 522 (format N) can be a format that enables server-side rendering of a preview of the requested content item for client device 150.

Target format 522 can depend on original format 520, as some formats may have certain conversion limitations or requirements. Target format 522 may also depend on the specific requirements and functionalities being requested and/or provided. For example, target format 522 can depend on the desired resolution of a content item preview, whether the content item is password protected, whether the conversion is implemented to enable a user to sign or otherwise protect the content item, etc. To illustrate, content preview service 130 may receive a request to generate a preview of a content item having format B (506). Content preview service 130 may select format N (510) as target format 522 for a preview of the content item if the original content item is password protected and content preview service 130 intends to maintain password protection for the preview. In other cases, content preview service 130 may select format C (508) to provide signing functionality or better resolution.

Conversion rules 502 in FIG. 5A define the rules for converting the content item from format B (506) to format N (510). According to conversion rules 502, format B (506) should be first converted to format C (508), and format N (510) can then be generated from format C (508). Thus, the conversion flow in FIG. 5B first performs conversion 524 to convert the content item from format B (506) to format N (510). A conversion engine (e.g., content preview service 130) can obtain the content item at format B (506) as input and perform conversion 524 to generate an output in format C (508). Conversion 524 can convert data encoded in the content item from format B (506) to format C (508). The conversion (524) can involve changing bits in the content item from format B (506) to format C (508), generating a new content item with a new extension, recognizing and translating data between formats, exporting and importing data to generate a new content item in format C (508), etc.

Conversion 524 outputs a version of the content item according to format C (508). Format C (508) is an intermediate format for generating format N (510), as defined in conversion rules 502. Format C (508) can be provided as input for conversion 526, to convert format C (508) to format N (510). Conversion 526 can generate an output of the content item in format N (510), which is the target format (522).

For example, assume content preview service 130 receives a request to preview a password-protected PDF file. In this example, format B (506) is PDF. Content preview service 130 selects or identifies JPEG as target format 522 based on conversion requirements, resolution requirements, security requirements, functionality requirements, etc. Based on conversion rules 502, content preview service 130 determines that the PDF file should be converted to PNG (Format C), and the PNG file then converted to JPEG (Format N). Thus, content preview service 130 performs conversion 524 to convert the PDF file into a PNG file. Content preview service 130 then performs conversion 526 to convert the PNG file into a JPEG file. The JPEG can depict and/or contain data from the original PDF file, and can be rendered as a preview for the PDF file. Once the PDF file has been converted to the JPEG file, the original file (PDF) is in target format 522 and ready to be provided to client device 150 as a preview of the PDF file as described herein.

Figure 6:
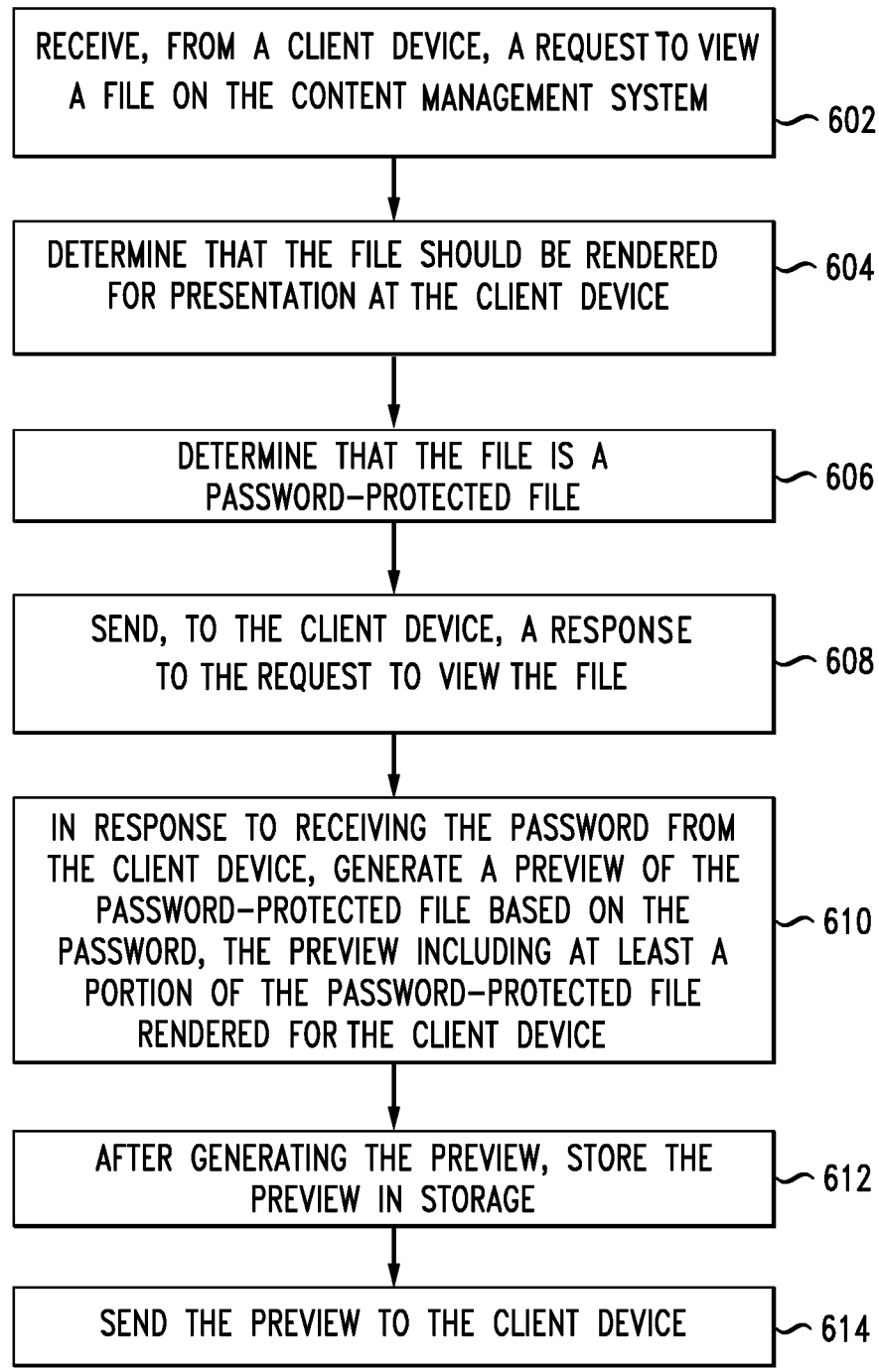
FIG. 6 illustrates an example method for server-side rendering password-protected files.
Figure 7:
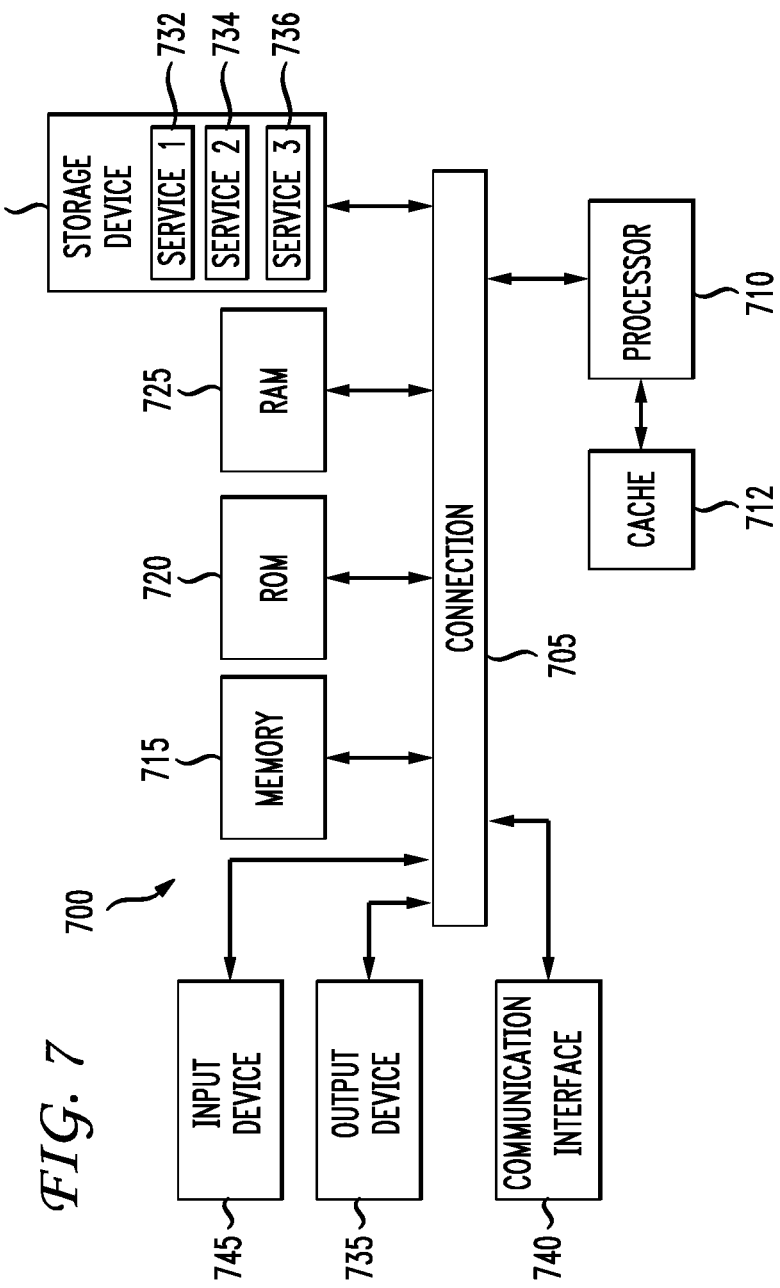
FIG. 7 illustrates an example system embodiment.

Having disclosed example system components and concepts, the disclosure now turns to the example method shown in FIG. 6. For the sake of clarity, the method is described with reference to client device 150, content management system 110, and content preview service 130, as shown in FIGS. 1 and 2, configured to perform the various steps in the method. The steps outlined herein are examples and can be implemented in any combination thereof, including combinations that exclude, add, or modify certain steps.

At step 602, content management system 110 receives, from client device 150, a request (e.g., file request 202) to view a file on content management system 110. The request can be received from a client application at client device 150. In some cases, the request is received from a web browser (e.g., browser application 162) at client device 150. Web interface service 124 can receive the request from the web browser and forward the request to content preview service 130, which can handle the request.

At step 604, content management system 110 determines that the file should be rendered for presentation to client device 150. In some cases, step 604 can involve determining that the client application at client device 150 is not the native application for the file. The native application of the file can include a predetermined type of application developed for the type, format, and/or features of the file. For example, the native application of the file can be an application designed to (or capable of) render and/or handle the specific type of content, layer(s), format or extension of the file without requiring additional software such as a plugin, an encoder, a rendering engine, a third-party software program or component, etc. To illustrate, assume the client application is a web browser and the file is a PDF file. The native application for the PDF file may be a PDF reader designed to natively handle and render PDF files. In this example, the web browser is not the native application of the PDF file and may not be capable of rendering PDF files without additional software or without first adjusting the content, layer(s), objects, or format of the PDF files. Content management system 110 may thus determine that the PDF file should be rendered prior to presentation at the web browser.

In some cases, step 604 can involve determining that the file should be converted from an original format (e.g., PDF) to a different format (e.g., an image format) prior to presentation at client device 150. For example, content preview service 130 at content management system 110 can receive the request from the client application at client device 150, and determine that the file should be converted to a specific format and rendered according to that specific format for presentation at the client application on client device 150.

At step 606, content management system 110 determines that the file is a password-protected file, such as a password-protected PDF file. In some cases, content management system 110 can determine that the file is password protected after attempting to generate or render a preview of the file. For example, content preview service 130 can attempt to generate or render a preview of the file and obtain an error indicating that the file is password protected.

At step 608, content management system 110 can send client device 150 a response to the request to view the file. The response can include a password error and/or an indication that the file is password protected. For example, if the request does not include a password (or the correct password) for the password-protected file, content preview service 130 can generate a notification (e.g., 208) indicating that the file requires a password and provide the notification to web interface service 124 for forwarding to client device 150. Client device 150 can receive the notification and generate a prompt for a password to the file. Client device 150 can obtain the password from a user and resend the request to content management system 110 along with the password.

At step 610, in response to receiving the password from client device 150, content management system 110 generates a preview (e.g., preview 222) of the password-protected file based on the password. The preview can include at least a portion of the data or content in the password-protected file, rendered for the client application at client device 150. In some cases, the preview can be rendered in a specific format for the client application. For example, the preview can include a text and/or image layer extracted from the password-protected file and converted into a different format for rendering at the client application.

After generating the preview, at step 612, content management system 110 can store an encrypted copy of the preview in storage. For example, content preview service 130 can use the password and/or request to encrypt the preview and cache the preview for future use. This way, any subsequent requests for the preview from client device 150 can be served using the stored preview without having to again generate the preview for the password protected file. Moreover, by storing the preview in encrypted form, content preview service 130 can maintain the integrity and protection of the preview as intended by the password protection set for the password-protected file. Content preview service 130 can use the password and/or request to decrypt the preview when serving subsequent requests. This ensures that the preview is not provided to client device 150 unless client device 150 proves to have possession of the password set to protect the file.

At step 614, content management system 110 sends the preview to client device 150. Client device 150 can receive the preview and display the preview in a graphical user interface. For example, client device 150 can display the preview in browser application 162 and/or a previewer on client device 150 configured to render or present the preview.

If content management system 110 receives a subsequent request for the password-protected file, content management system 110 can perform a lookup in cache and provide the preview from cache if the preview is available in cache and the request includes the proper authentication (e.g., the password). For example, content management system 110 can receive a subsequent request and use the request and/or a password in the request to search for a cached copy of the preview. If content management system 110 does not detect a cached copy of the preview, content management system 110 can proceed with the process for generating the preview. On the other hand, if content management system 110 identifies a cached copy of the preview, it can decrypt the preview with the password and/or request and provide the decrypted preview to client device 150 without having to re-generate the preview for the password-protected file.

In some cases, when content management system 110 receives the password for the file from client device 150, it can create a token or data blob with the password and provide the token or data blob to client device 150 to use when requesting the password-protected file. Client device 150 can retry the request and include the token or data blob in the request to obtain authorization to access the preview. Content management system 110 can store the request with the token and/or data blob in cache, which content management system 110 can use to identify the preview for subsequent requests, confirm authorization to access the preview by client device 150, decrypt the preview for client device 150, etc.

FIG. 7 illustrates an example computing system architecture 700 wherein the components of the system are in communication with each other using a connection 705. Connection 705 can be a physical connection via a bus, or direct connection into processor 710 such as in a chipset architecture. Connection 705 can also be a virtual connection, networked connection, or logical connection.

In some embodiments 700 is a distributed system, wherein the functions described with respect to the components herein can be distributed within a datacenter, multiple datacenters, geographically, etc. In some embodiments, one or more of the described system components represents many such components each performing some or all of the function for which the component is described. In some embodiments, the components described herein can be physical or virtual devices.

Example system 700 includes at least one processing unit (CPU or processor) 710 and a connection 705 that couples various system components including the system memory 715, such as read only memory (ROM) and random access memory (RAM) to the processor 710. The system 700 can include a cache of high-speed memory connected directly with, in close proximity to, or integrated as part of the processor 710.

The processor 710 can include any general purpose processor and a hardware service or software service, such as service 1 732, service 2 734, and service 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The description and drawings herein are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or any example term. Likewise, the disclosure is not limited to various embodiments given in this specification.

As used herein, claim language reciting "at least one of" a first item "and" a second item indicates that the first item, the second item, or both the first and second item satisfy the claim. For example, claim language reciting "at least one of A and B" indicates that either a set of A or B (e.g., A only or B only) or a set of A and B (e.g., both A and B) can satisfy the claim.

What is claimed is:

1. A method for rendering password-protected files comprising:
    receiving, through a web interface service of a content management system, from a client application at a client device, an initial request to view a password protected file on the content management system;
    converting, based on one or more conversion flow rules, one or more intermediate files in a first format associated with the password protected file to a final password protected file in a second format associated with the client application, wherein the first format is different from the second format;
    storing an encrypted preview of the final password protected file and an encrypted version of the final password protected file in the second format, wherein the encrypted preview represents a portion of the final password protected file;

retrieving, by the content management system in a first instance, the encrypted preview stored in the content management system;

decrypting the encrypted preview of the final password protected file using a password that is stored or a token that is stored;

sending, through the web interface service of the content management system to the client application at the client device in response to the initial request, a decrypted copy of the encrypted preview;

retrieving, by the content management system in a second instance, the encrypted version of the final password protected file in the second format;

decrypting the encrypted version of the final password protected file using the password that is stored or the token that is stored; and sending, through the web interface service of the content management system to the client application at the client device, a decrypted version of the final password protected file.

2. The method of claim 1, further comprising determining, by the content management system, that the client application associated with the initial request is different from a native application associated with the password protected file.

3. The method of claim 1, wherein decrypting the encrypted preview using the token comprises:

extracting a second password from the token;

accessing the encrypted preview with the second password; and converting the encrypted preview from an original format to a different format to yield the decrypted copy of the encrypted preview.

4. The method of claim 1, wherein the content management system stores the final password protected file in the second format.

5. The method of claim 1, wherein the retrieving the encrypted preview further comprises:

performing a cache lookup, based on identifying information used to encrypt the encrypted preview, to determine that the encrypted preview of the final password protected file was previously generated;

extracting the encrypted preview of the final password protected file that was previously generated based on the cache lookup; and providing the encrypted preview of the final password protected file that was previously generated to the web interface service.

6. The method of claim 5, wherein the identifying information includes at least one of a second password associated with the token, the initial request, a key based on the initial request, and a data structure based on the initial request.

7. The method of claim 1, further comprising:

receiving, a second token;

storing the second token; and using the second token to decrypt the encrypted preview of the final password protected file.

8. The method of claim 1, further comprising: generating a tree structure for the initial request; and using the tree structure as an initial request specific password.

9. The method of claim 1, further comprising:

receiving a notification of a password error in response to retrieving the encrypted preview in the first instance and before decrypting the encrypted preview;

attempting to decrypt the encrypted preview, wherein the password error indicates that the initial request includes an improper or missing initial password;

based on the password error, determining that the retrieved encrypted preview of the password protected file is encrypted and failed to decrypt using the improper or missing initial password, wherein the password error indicates that an encryption key is needed; and storing the password or the token that is then used for decrypting the encrypted preview.

10. A non-transitory computer-readable medium comprising instructions stored therein which, when executed by one or more processors, cause the one or more processors to:

receive, through a web interface service of a content management system, from a client application at a client device, an initial request to view a password protected file on the content management system;

convert, based on one or more conversion flow rules, one or more intermediate files in a first format associated with the password protected file to a final password protected file in a second format associated with the client application, wherein the first format is different from the second format;

store an encrypted preview of the final password protected file and an encrypted version of the final password protected file in the second format, wherein the encrypted preview represents a portion of the final password protected file;

retrieve, by the content management system in a first instance, the encrypted preview stored in the content management system;

decrypt the encrypted preview of the final password protected file using a password that is stored or a token that is stored;

send, through the web interface service of the content management system to the client application at the client device in response to the initial request, a decrypted copy of the encrypted preview;

retrieve, by the content management system in a second instance, the encrypted version of the final password protected file in the second format;

decrypt the encrypted version of the final password protected file using the password that is stored or the token that is stored; and send, through the web interface service of the content management system to the client application at the client device, a decrypted version of the final password protected file.

11. The non-transitory computer-readable medium of claim of claim 10, storing additional instructions which, when executed by the one or more processors, cause the one or more processors to:

determine, by the content management system, that the client application associated with the initial request is different from a native application associated with the password protected file.

12. The non-transitory computer-readable medium of claim 10, wherein decrypting the encrypted preview includes additional instructions which, when executed by the one or more processors, cause the one or more processors to:

extract a second password from the token;
access the encrypted preview with the second password; and
convert the encrypted preview from an original format to a different format to yield the decrypted copy of the encrypted preview.

13. The non-transitory computer-readable medium of claim of claim 10, storing additional instructions which, when executed by the one or more processors, cause the one or more processors to:
perform a cache lookup, based on identifying information used to encrypt the encrypted preview, to determine that the encrypted preview of the final password protected file was previously generated;
extract the encrypted preview of the final password protected file that was previously generated based on the cache lookup; and
provide the encrypted preview of the final password protected file that was previously generated to the web interface service.

14. The non-transitory computer-readable medium of claim of claim 10, storing additional instructions which, when executed by the one or more processors, cause the one or more processors to:
receive a second token;
after receiving the second token, store the second token; and
use the second token to decrypt the encrypted preview of the final password protected file.

15. The non-transitory computer-readable medium of claim of claim 10, storing additional instructions which, when executed by the one or more processors, cause the one or more processors to:
generate a tree structure for the initial request; and
use the tree structure as an initial request specific password.

16. A content management system comprising:
one or more hardware processors; and
at least one non-transitory computer-readable storage medium having stored therein instructions which, when executed by the one or more hardware processors, cause the content management system to:
receive, through a web interface service of the content management system, from a client application at a client device, an initial request to view a password protected file on the content management system;
convert, based on one or more conversion flow rules, one or more intermediate files in a first format associated with the password protected file to a final password protected file in a second format associated with the client application, wherein the first format is different from the second format;
store an encrypted preview of the final password protected file and an encrypted version of the final password protected file in the second format, wherein the encrypted preview represents a portion of the final password protected file;
retrieve, by the content management system in a first instance, the encrypted preview stored in the content management system;
decrypt the encrypted preview of the final password protected file using a password that is stored or a token that is stored;
send, through the web interface service of the content management system to the client application at the client device in response to the initial request, a decrypted copy of the encrypted preview;
retrieve, by the content management system in a second instance, the encrypted version of the final password protected file in the second format;
decrypt the encrypted version of the final password protected file using the password that is stored or the token that is stored; and
send, through the web interface service of the content management system to the client application at the client device, a decrypted version of the final password protected file.

17. The content management system of claim 16, the at least one non-transitory computer-readable storage medium storing additional instructions which, when executed by the one or more hardware processors, cause the system to:
determine, by the content management system, that the client application associated with the initial request is different from a native application associated with the password protected file.

18. The content management system of claim 16, the at least one non-transitory computer-readable storage medium storing additional instructions which, when executed by the one or more hardware processors, cause the system to:
extract the password from the token; and
access the final password protected file with the password.

19. The content management system of claim 16, the at least one non-transitory computer-readable storage medium storing additional instructions which, when executed by the one or more hardware processors, cause the system to:
perform a cache lookup, based on identifying information used to encrypt the encrypted preview, to determine that the encrypted preview of the final password protected file was previously generated;
extract the encrypted preview of the final password protected file that was previously generated based on the cache lookup; and
provide the encrypted preview of the final password protected file that was previously generated to the web interface service.

* * * * *